United States Patent [19]
Benash et al.

[11] Patent Number: 6,097,719
[45] Date of Patent: *Aug. 1, 2000

[54] PUBLIC IP TRANSPORT NETWORK

[75] Inventors: Ray Benash, Havertown, Pa.; Kenneth P. D'Andrea, Marlton, N.J.

[73] Assignee: Bell Atlantic Network Services, Inc., Arlington, Va.

[*] Notice: This patent is subject to a terminal disclaimer.

[21] Appl. No.: 08/815,364

[22] Filed: Mar. 11, 1997

[51] Int. Cl.[7] ................................................. H04M 3/42
[52] U.S. Cl. ......................... 370/352; 370/356; 379/221
[58] Field of Search .................................. 370/352, 356, 370/400, 401, 410, 463, 522; 379/210, 211, 212, 220, 221

[56] References Cited

U.S. PATENT DOCUMENTS

| | | |
|---|---|---|
| 5,247,571 | 9/1993 | Kay et al. . |
| 5,309,437 | 5/1994 | Perlman et al. . |
| 5,311,572 | 5/1994 | Friedes et al. ........................ 379/211 |
| 5,406,557 | 4/1995 | Baudoin . |
| 5,430,727 | 7/1995 | Callon . |
| 5,475,732 | 12/1995 | Pester, III . |
| 5,661,791 | 8/1997 | Parker ..................... 379/211 |
| 5,790,548 | 8/1998 | Sistanizadeh et al. .................. 370/400 |
| 5,805,688 | 9/1998 | Gillespie et al. ....................... 379/211 |

Primary Examiner—Chi H. Pham
Assistant Examiner—Frank Duong
Attorney, Agent, or Firm—McDermott, Will & Emery

[57] ABSTRACT

A system and method for providing IP transport and Internet services using a public switched telephone network (PSTN) and providing equal access. The system provides a wide area communications network serving a plurality of defined geographic areas such as LATAs, served by a switched telephone network having a plurality of central office switching systems in the telephone network in each geographic area connected to a plurality of terminals in premises served by said switching systems in those geographic areas. A switched multimegabit data service (SMDS) network spans the geographic areas and a plurality of Internet service providers (ISPs) are connected to the SMDS network. At least one data hub node is provided in each geographic area and each hub node is connected to the SMDS network. Each data hub node includes a gateway router connected via a packet switch and at least one multi-port access server to one of the central office switching systems for switched connection to selected ones of the premises. The PSTN is controlled by an advanced intelligent network having service switching points, service transfer points, and a service control point having databases associated therewith. The ISPs are provided with virtual numbers and subscribe to multiple ports on the terminal access servers. One of the databases associated with the service control point provides a translation from the virtual number to the identity of an ISP. Another of the databases provides a translation based on the identity of the ISP and the calling station to a port. Connection is made between the calling station and the ISP via the port, router, and SMDS network.

25 Claims, 7 Drawing Sheets

|   | CUST_ANI (TELEPHONE) | CUST_ZIP 4 (INTEGER) |
|---|---|---|
| 1 | 301-300-2010 | 212301234 |
| 2 | 301-300-3276 | 222221111 |
| 3 | 301-393-2503 | 212301235 |
| ⋮ | ↓ | ↓ |
| N | 301-393-4567 | 222221789 |

| EXTENDED ZIP CODE | DESIGNATED COMPANY PORT |
|---|---|
| 21230-4124 | 301-774-3456 |
| 21230-4125 | 301-774-3456 |
| 21250-4126 | 301-388-1211 |
| ↓ | ↓ |
| 21230-9999 | 301-388-1211 |

PUBLIC IP TRANSPORT NETWORK

RELATED APPLICATIONS

This application is a continuation-in-part of application Ser. No. 08/815,363, filed Mar. 11, 1997, entitled Public IP Transport Network. The application is related to copending application Ser. No. 08/388,058, filed Feb. 2, 1995, entitled Method and Apparatus for Routing Calls Placed to a Virtual Telephone Number. The foregoing applications are owned by the assignee of the instant application.

FIELD OF THE INVENTION

This invention relates generally to the integration of multiple types of local area networks (LANs) into a wide area network (WAN) using a set of protocols generally known as TCP/IP where TCP stands for Transmission Control Protocol, and IP is Internet Protocol. The invention provides multiple types of interconnection using PSTN (Public Switched Telephone Network) facilities to provide cost effective IP internetwork data transport. The system will provide an equal access model pursuant to the MFJ (Modified Final Judgment) and currently applicable statutes for accessing inter-LATA Internet carriers. The following background material introduces various computer network concepts and definitions and those familiar with computer networks and TCP/IP may wish to skip to following subsections.

COMPUTER NETWORK BACKGROUND

A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

A bridge is a device that is connected to at least two LANs and serves to pass message frames or packets between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network. A detailed knowledge of network architecture is not needed for an understanding of this invention, but a brief description follows by way of further background.

At the heart of any computer network is a communication protocol. A protocol is a set of conventions or rules that govern the transfer of data between computer devices. The simplest protocols define only a hardware configuration, while more complex protocols define timing, data formats, error detection and correction techniques and software structures.

Computer networks almost universally employ multiple layers of protocols. A low-level physical layer protocol assures the transmission and reception of a data stream between two devices. Data packets are constructed in a data link layer. Over the physical layer, a network and transport layer protocol governs transmission of data through the network, thereby ensuring end-to end reliable data delivery.

The most common physical networking protocol or topology for small networks is Ethernet, developed by Xerox. When a node possesses a packet to be transmitted through the network, the node monitors the backbone and transmits when the backbone becomes clear. There is no central backbone master device to grant requests to gain access to the backbone. While this type of multipoint topology facilitates rapid transmission of data when the backbone is lightly utilized, packet collisions may occur when the backbone is heavily utilized. In such circumstances, there is a greater chance that multiple nodes will detect that the backbone is clear and transmit their packets coincidentally. If packets are impaired in a collision, the packets are retransmitted until transmission is successful.

Another conventional physical protocol or topology is Token Ring, developed by IBM. This topology employs a "token" that is passed unidirectionally from node to node around an annular backbone. The node possessing the token is granted exclusive access to the backbone for a single packet transfer. While this topology reduces data collisions, the latency incurred while each node waits for the token translates into a slower data transmission rate than Ethernet when the network is lightly utilized.

As computer networks have developed, various approaches have been used in the choice of communication medium, network topology, message format, protocols for channel access, and so forth. Some of these approaches have emerged as de facto standards, but there is still no single standard for network communication. However, a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

Bridges may be designed to operate in the MAC sublayer. Further details may be found in "MAC Bridges," P802.1D/D6, September 1988, a draft publication of IEEE Project 802 on Local and Metropolitan Area Network Standards, or in later drafts of this document.

The basic function of a bridge is to listen "promiscuously," i.e., to all message traffic on all LANs to which it is connected, and to forward each message it hears onto LANs other than the one from which the message was heard. Bridges also maintain a database of station locations, derived from the content of the messages being forwarded. Bridges are connected to LANs by paths known as "links." After a bridge has been in operation for some time, it can associate practically every station with a particular link connecting the bridge to a LAN, and can then forward messages in a more efficient manner, transmitting only over the appropriate link. The bridge can also recognize a message that does not need to be forwarded, because the source and destination stations are both reached through the same link. Except for its function of "learning" station locations, or at least station directions, the bridge operates basically as a message repeater.

As network topologies become more complex, with large numbers of LANs, and multiple bridges interconnecting them, operational difficulties can ensue if all possible LAN bridging connections are permitted. In particular, if several LANs are connected by bridges to form a closed loop, a message may be circulated back to the LAN from which it was originally transmitted, and multiple copies of the same message will be generated. In the worst case, messages will be duplicated to such a degree that the networks will be effectively clogged with these messages and unable to operate at all.

To prevent the formation of closed loops in bridged networks, IEEE draft publication P802.1D, referred to above, proposes a standard for a spanning tree algorithm that will connect the bridged network into a tree configuration, containing no closed loops, and spanning the entire network configuration. The spanning tree algorithm is executed periodically by the bridges on the interconnected network, to ensure that the tree structure is maintained, even if the physical configuration of the network changes. Basically, the bridges execute the spanning tree algorithm by sending special messages to each other to establish the identity of a "root" bridge. The root bridge is selected, for convenience, as the one with the smallest numerical identification. The algorithm determines which links of the bridges are to be active and which are to be inactive, i.e., disabled, in configuring the tree structure. One more piece of terminology is needed to understand how the algorithm operates. Each LAN has a "designated" link, which means that one of the links connectable to the LAN is designated to carry traffic toward and away from the root bridge. The basis for this decision is similar to the basis for selecting the root bridge. The designated link is the one providing the least costly (shortest) path to the root bridge, with numerical bridge identification being used as a tie-breaker. Once the designated links are identified, the algorithm chooses two types of links to be activated or closed: first, for each LAN its designated link is chosen, and second, for each bridge a link that forms the "best path" to the root bridge is chosen, i.e., a link through which the bridge received a message giving the identity of the root bridge. All other links are inactivated. Execution of the algorithm results in interconnection of the LANs and bridges in a tree structure, i.e., one having no closed loops.

Internet is a collection of networks, including Arpanet, NSFnet, regional networks such as NYsernet, local networks at a number of university and research institutions, and a number of military networks. The protocols generally referred to as TCP/IP were originally developed for use only through Arpanet and have subsequently become widely used in the industry. The protocols provide a set of services that permit users to communicate with each other across the entire Internet. The specific services that these protocols provide are not important to the present invention, but include file transfer, remote log-in, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TOP: delivering datagrams to their destinations. TOP simply hands IP a datagram with an intended destination; IP is unaware of any relationship between successive datagrams, and merely handles routing of each datagram to its destination. If the destination is a station connected to a different LAN, the IP makes use of routers to forward the message.

TOP/IP frequently uses a slight deviation from the seven-layer OSI model in that it may have five layers. These five layers are combinations and derivatives of the seven-layer model as shown in FIG. 1. The five layers are as follows:

Layer 5—The Application Layer. Applications such as ftp, telnet, SMTP, and NFS relate to this layer.

Layer 4—The Transport Layer. In this layer, TOP and UDP add transport data to the packet and pass it to layer 3.

Layer 3—The Internet Layer. When an action is initiated on a local host (or initiating host) that is to be performed or responded to on a remote host (or receiving host), this layer takes the package from layer 4 and adds IP information before passing it to layer 2.

Layer 2—The Network Interface Layer. This is the network device as the host, or local computer, sees it and it is through this medium that the data is passed to layer 1.

Layer 1—The Physical Layer. This is literally the Ethernet or Serial Line Interface Protocol (SLIP) itself.

At the receiving host the layers are stripped one at a time, and their information is passed to the next highest level until it again reaches the application level. If a gateway exists between the initiating and receiving hosts, the gateway takes the packet from the physical layer, passes it through a data link to the IP physical layer to continue, as is shown in FIG. 2. As a message is sent from the first host to the second, gateways pass the packet along by stripping off lower layers, readdressing the lower layer, and then passing the packet toward its final destination.

A router, like a bridge, is a device connected to two or more LANs. Unlike a bridge, however, a router operates at the network layer level, instead of the data link layer level. Addressing at the network layer level makes use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and are globally unique, i.e., no two hosts, wherever located, have the same data link layer address. There is a protocol called ARP (address resolution protocol), which obtains a data link layer address from the corresponding network layer address (the address that IP uses). Typically, each router maintains a database table from which it can look up the data link layer address, but if a destination host is not in this ARP database, the router can transmit an ARP request. This message basically means: "will the host with the following network layer address please supply its data link layer address." Only the addressed destination host responds, and the router is then able to insert the correct data link layer address into the message being forwarded, and to transmit the message to its final destination.

IP routing specifies that IP datagrams travel through internetworks one hop at a time (next hop routing) based on the destination address in the IP header. The entire route is not known at the outset of the journey. Instead, at each stop, the next destination (or next hop) is calculated by matching the destination address within the datagram's IP header with an entry in the current node's (typically but not always a router) routing table.

Each node's involvement in the routing process consists only of forwarding packets based on internal information resident in the router, regardless of whether the packets get to their final destination. To extend this explanation a step further, IP routing does not alter the original datagram. In particular, the datagram source and destination addresses remain unaltered. The IP header always specifies the IP address of the original source and the IP address of the ultimate destination.

When IP executes the routing algorithm it computes a new address, the IP address of the machine/router to which the datagram should be sent next. This algorithm uses the information from the routing table entries, as well as any cached information local to the router. This new address is most likely the address of another router/gateway. If the datagram can be delivered directly (the destination network is directly attached to the current host) the new address will be the same as the destination address in the IP header.

The next hop address defined by the method above is not stored in the IP datagram. There is no reserved space to hold it and it is not "stored" at all. After executing the routing algorithm (the algorithm is specific to the vendor/platform) to define the next hop address to the final destination. The IP protocol software passes the datagram and the next hop address to the network interface software responsible for the physical network over which the datagram must now be sent.

The network interface software binds the next hop address to a physical address (this physical address is discovered via address resolution protocols (ARP, RARP, etc.), forms a frame (Ethernet, SMDS, FDDI, etc.—OSI layer 2 physical address) using the physical address, places the datagram in the data portion of the frame, and sends the result out over the physical network interface through which the next hop gateway is reached. The next gateway receives the datagram and the foregoing process is repeated.

In addition, the IP does not provide for error reporting back to the source when routing anomalies occur. This task is left to another Internet protocol, the Internet Control Message Protocol (ICMP).

A router will perform protocol translation. One example is at layers 1 and 2. If the datagram arrives via an Ethernet interface and is destined to exit on a serial line, for example, the router will strip off the Ethernet header and trailer, and substitute the appropriate header and trailer for the specific network media, such as SMDS, by way of example.

A route policy may be used instead of routing table entries to derive the next hop address. In the system and methodology of the present invention, the source address is tested to see in which ISP address range it falls. Once the ISP address range is determined the packet is then routed to the next hop address associated with the specific ISP.

Data communications network services have two categories of call establishment procedures: connection-oriented and connectionless.

Connection-oriented network services require that users establish a single distinct virtual circuit before the data can be transmitted. This circuit then defines a fixed path through the network that all traffic follows during the session. Several packet switching services are connection-oriented, notably X.25 and Frame Relay. X.25 is the slower of the services, but has built-in error correction—enough for its performance not to depend on clean, high-quality optical fiber lines. Frame relay, regarded as the first generation of fast packet technology, is well-suited for high-speed burst data communication applications.

Connectionless network services, by contrast, let each packet of a communications session take a different, independent path through the network. One example is the Switched Multimegabit Data Service (SMDS), a possible precursor to broadband ISDN. This fast-packet service supports data rates ranging from the T1 rate of 1.544 Mb/s up to 1 Gb/s. The SMDS transport system architecture is defined by IEEE 802.6 Metropolitan Area Network standards.

SMDS supports LAN interconnection and allows the transfer of large, variable length service data units (SDUs). Like frame relay, SMDS allows the user to connect multiple remote routers without having to employ a mesh network. However, as compared to frame relay, SMDS affords a number of advantages. Among these are that it is a connectionless service better suited for LAN traffic, it supports higher access rates and throughput for evolving applications (DS3 and SONET), it supports higher burstiness, and SMDI's cell relay technology implies that it will migrate smoothly to BISDN.

The process of routing packets over the Internet is also considered a connectionless network service. The Internet Protocol (IP) addresses packets from sender to receiver. It is still used mostly in conjunction with the Transmission Control Protocol (TOP), which establishes a connection between end users to manage the traffic flow and ensures the data are correct, providing end-to-end reliability. The combination, known as TOP/IP, is the Internet's main backbone protocol suite.

Asynchronous transfer mode (ATM) is a connection-oriented network service. It is a high-bandwidth, fast-packet switching and multiplexing technique that segments packets into 53-byte cells. It supports sound (voice and audio), data, documents (text, graphics and still images), and video (moving pictures with sound). ATM and SDH/SONET are key technologies enabling broadband ISDN.

The Problem

The Internet has outgrown its academic origins to become a working version of the global information infrastructure and use of the Internet Protocol (IP) has become widespread. A broad spectrum of companies are indicating an interest and belief in the Internet's potential for a wide variety of services and are desirous of using IP for internetwork communication. An almost limitless scope of data exchange is under current investigation for transfer between varying types of LANs, MANs (metropolitan area networks) and WANs using both connection oriented and connectionless procedures of numerous types. Each procedure has its advocates and perceived advantages and disadvantages, and is currently in use to at least some extent. In this evolutionary stage there is a need for a cost effective IP transport system that can accommodate these plural procedures and approaches on a widespread geographic basis.

Prior Art

Perlman et al. U.S. Pat. No. 5,309,437 issued May 3, 1994, entitled "Bridge-Like Internet Protocol Router". The patent pertains to local area networks (LANs) of computers and to multiple LANs that are interconnected by bridges and routers. The patent is directed to a problem that arises in interconnected networks using the TOP/IP protocols. A bridge is defined as a device that connects at least two LANs and serves to pass message frames or packets between LANs so that a source station on one LAN can transmit data to a destination station on another LAN without concern for the location of the destination. A router is defined in the patent as a device connected to two or more LANs that operates at the network level layer. A data link layer address is needed to complete forwarding a message to the destination host after the message reaches its destination network. ARP (address resolution protocol) obtains a data link layer address from the corresponding network layer address. ARP messages are said to cause problems when bridges are used within an extended network of LANs. ARP packets can be duplicated by bridges and this can result in "flurries" of ARP packets which can disrupt normal traffic flow.

The patent proposes the solution of using a bridge-like IP router called a BLIP. This functions like a bridge for non-TOP/IP traffic and functions in a bridge-like manner for TOP/IP traffic. It functions like a bridge at the network layer level of addressing.

The method of the patent includes configuring an extended local area network (LAN) to include a plurality of extended LAN segments connected to bridge-like IP routers (BLIPs). These receive a packet of data at a BLIP and determine whether the packet has been transmitted under TOP/IP protocols. Non-TOP/IP packets are processed in the manner of a conventional bridge and TOP/IP traffic is processed in a manner analogous to a bridge.

Baudoin U.S. Pat. No. 5,406,557 issued on Apr. 11, 1995, is entitled "Interenterprise Electronic Mail Hub". The patent relates to electronic mail on wide area networks and includes multiple incompatible electronic mail applications. The patent deals primarily with the transmission of E-Mail and enables users located in different locales to use different E-Mail Protocols.

The patent utilizes an electronic communication center (ECC) that serves as a hub for routing messages. The ECC has a message queue, a queue management system, an address table and a plurality of translation modules. The ECC converts all incoming E-Mail messages to a nonuser specific standard protocol. Then, based upon the destination address, the ECC converts the nonstandard protocol to the appropriate protocol for each destination user. FIG. 1 illustrates an embodiment of the invention. In that figure the block 2 represents an enterprise which includes various internal entities 4, 6, 8, and 10 connected to users located outside of enterprise 2. This communication equipment connects to a communications hub 14 which may be a mainframe or mini-computer. Hub 14 contains a plurality of communication modules useful for interfacing with individual pieces of communications equipment.

Each piece of communication equipment internal to enterprise 2 connects to one of the internal communication modules 16. Network interfaces and communication equipment external to enterprise 2 connect to one of the external communication modules 18. Thus, hub 14 is divided into two halves, an internal communication half 14a and an external communication half 14b. The internal communications module 16 converts messages and information data between a "universal" format and protocol internal to hub 14 and the protocol and format used by the associated piece of communications equipment. Hub 14 look at the destination address for a message received from one of the entities 4, 6 or 10 and routes the message to the appropriate external communication module 18. Module 18 converts the universal format message into the specific message format and protocol required by the end user. For example, module 18a connects to the Internet.

Callon U.S. Pat. No. 5,430,727 issued Jul. 4, 1995. The patent deals with calculating routes for sending user data packets through an interconnected network of information handling devices. It utilizes two protocol suites. One is the OSI-I and the other is the TOP/IP. The patent allows data packets to be forwarded from one local area network to another by a device acting as a router and allows the first protocol suite to act as a bridge rather than a router.

OBJECTS OF THE INVENTION

It is a primary object of the present invention to provide a system and method for meeting the above described need and solving the problem which it presents.

It is another object of the invention to meet this need using plant, facilities and technologies which are individually available to a large extent in the public switched telephone network (PSTN).

It is yet another object of the invention to accomplish the foregoing in a fashion which presents cost advantages to both users and providers of the involved services.

It is another object of the invention to provide such a system and method which will permit customers to be able to access information through a variety of communication facilities offering service at multiple selectable speeds of access and different types of connectivity.

It is a further object of the invention to provide such a system through use of the public switched telephone network using an equal access model and source routing.

It is another object of the invention to provide a public IP transport network wherein single number calling is implemented.

SUMMARY OF THE INVENTION

In a simplified sense the present invention is directed to providing a common carrier platform and methodology for implementing access to the Internet and related IP data transport service for users or customers employing a wide variety of procedures and intranetwork protocols. The target customers for the service constitute Internet Service Providers (ISPs) as well as intranet users such as small and large corporations who wish to use IP in support of their corporate networks. In this sense the invention involves supplying IP transport service and a Telco maintained and operated IP transport network. In another sense the invention provides Internet access to widespread local areas served by a public switched telephone network. In the latter example a consumer access provider company, which may or may not be Telco owned, may obtain access to Telco customers virtually throughout its operating region. This may be accomplished according to the invention without violation of the currently existing judicial and regulatory proscription of inter-LATA message service by a regional Telco.

Customers may obtain the use of various types of ports on the Telco platform such as, by way of example, analog 28.8 Kb/s service, ISDN service, dedicated ports for SMDS (switched multimegabyte data service), frame relay, T1, DDS or other available services. As a matter of convenience the hubs will be collocated with central office switching systems and oftentimes may be sited in the same building. Each hub and its equipment will be operated, maintained and provisioned by Telco personnel.

The current availability of the Telco SMDS service, with its previously described advantages, makes feasible virtually immediate provision of service to large business customers capable of interfacing via SMDS. This facilitates limitation of the load or traffic on the gateway routers in the hubs inasmuch as the SMDS signals may be bypassed around the router.

A key component of the system is the LATA hub wherein one such hub is provided for each LATA. In one Telco example 10 such LATA hubs are utilized. Dedicated access is offered only from such LATA hubs and will support connectionless services such as frame relay or SMDS, which are currently tariffed fast packet services which are non-distance sensitive. Other presently tariffed services also will be available from these LATA hubs, such as DDS or T1, however these services involve point to point circuits which require additional hardware and are distance sensitive. The system of the invention would allow Internet service provider customers such as UUNet, PSI, and the like, to concentrate on providing service, which is the source of their income, and refrain from investing capital in infrastructure and infrastructure provisioning and maintenance.

The main module of equipment in the hub is the gateway router. The gateway router is connected via redundant links to the Telco LATA SMDS network or "cloud" and thence to the Internet at large. The SMDS links may be 34 Mb/s or T1 links or any combination thereof or of similar links.

The Internet Protocol Routing Service (IPRS) of the invention provides for the collection, concentration and management of the customers traffic within a LATA. IP Routing Service comprises network routers located at LATA hub sites that will collect the customer's (ISP's) end user traffic and concentrate it for connection and transport over a Telco Exchange Access Switched Multi-Megabit Data Service (XASMDS) Subscriber Network Interface. By way of example, the IP routing service may provide six types of ports for the collection of end user traffic. The port type or types are determined by the method chosen by the customer for access to its end users. The six port types may be analog dial-up, Integrated Services Digital Network (ISDN) dial-up, Digital Data Service (DDS), DS1 (Digital Service, level 1), 56 kbps Frame Relay, and 1.544 Mbps (T-1) Frame Relay. The IP Routing Service may use RADIUS (Remote Authentication Dial-in User Service) as a network security protocol, for the customer's (ISP's) authentication and authorization of the ISP's dial-up end users. The reference to six port types is exemplary only and additional port types may be added within the scope of the invention.

Another advantage is that when connections are made under the SMDS cloud it is not necessary to pass that traffic through the gateway router in the cognizant hub to get to the Internet. The customer can peer directly to their Internet carrier of choice, their ISP of choice. If frame relay switches were being used there would not be a direct peer relationship. It would be necessary to pass through a central site router at some point. This would create congestion in the gateway router.

Traffic from a customer's switched access end users passes through the central office switching system with which the mini-hub or the LATA hub is collocated. This traffic passes from the central office switch to communication access servers (sometimes referred to herein as access servers or network access servers or NASs) and thence to an Ethernet packet switch in the hub. The access servers perform on a more limited scale the same functionality as the gateway router. Thus the access servers deliver the physical PRI on the central office switch side as 10baseT to the Ethernet switch, the translation having occurred in the access server. The access servers handle either POTS (Plain Old Telephone Service) or ISDN (Integrated Service Digital Network) signals. From the Ethernet switch performs further concentration and switching to a 100baseT link to the gateway router. The gateway router in turn acts as an IP packet switch and routes the traffic to the SMDS network or cloud. The gateway router performs the same packet switch function to route SMDS to frame relay or to route Ethernet to frame relay or the converse.

It is an important feature of the invention that source routing may be implemented.

Each LATA hub and each mini-hub has an administrative router to provide for maintenance. It is a further feature of the invention that a maintenance backbone network is provided to troubleshoot and maintain the entire network. The administrative router has access to all of the different modules of equipment in the hub and network both through the SMDS network as well as through a frame relay overlay network to a central Telco maintenance center. The frame relay cloud serves as a maintenance backbone network and traverses all 80 hub sites in this example. Inasmuch as this performs a management function, the communication across LATA boundaries is permissible under applicable regulations.

According to the invention the operation of the entire network is monitored using SNMP (simplified network management protocol). When trouble is detected via the SMDS network, this is further analyzed using the frame relay backup network. Correction is effected through the frame relay network.

The maintenance center includes a server or router and a group of terminals providing interfaces to the SMDS and frame relay networks. A technician at a terminal at the maintenance site may control trouble shooting and provide centralized maintenance of the entire IPRS network. The overlay network is used to provide automated management and maintenance functions beyond routine monitoring. The frame relay network is entirely private and provides secure addressing and levels of security not readily available via the main SMDS cloud. Whereas certain monitoring occurs via SNMP this constitutes a read only feature. The write function is reserved for the private frame relay network.

In utilizing the service and system of the invention a customer such as an Internet access provider, by way of example, who provides service in numerous calling areas, will have a subscription to a large number of LATA hubs, and a plurality of telephone numbers equal to the number of hubs which are subscribed. It is a feature of the invention that the PSTN may provide to such a subscriber a single number access service and thereby eliminate the need for such multiple directory numbers. According to one feature of the invention this is accomplished by utilizing an advanced intelligent network (AIN) overlay with the basic network. With this arrangement the identity of a station calling the single number is determined, a data base is accessed to match this station with a geographical location, a second data base is accessed to match the location to the number of the ISP subscriber node port serving that geographical area, and the call is then routed to the node port number which was obtained.

It will be appreciated from this summary that the invention represents a significant advance in the field of providing transport of Internet Protocol (IP) using facilities available in the public switched telephone network. The capability is not limited to Internet access but also provides intercommunication between multiple LAN and WAN segments. In the Internet context the invention provides an opportunity for cost effective expansion for diverse communication and information providers. Other aspects and advantages of the invention will become apparent from the following more detailed description, taken in conjunction with the accompanying drawings.

DESCRIPTION OF THE PREFERRED EMBODIMENT

Figure 3:
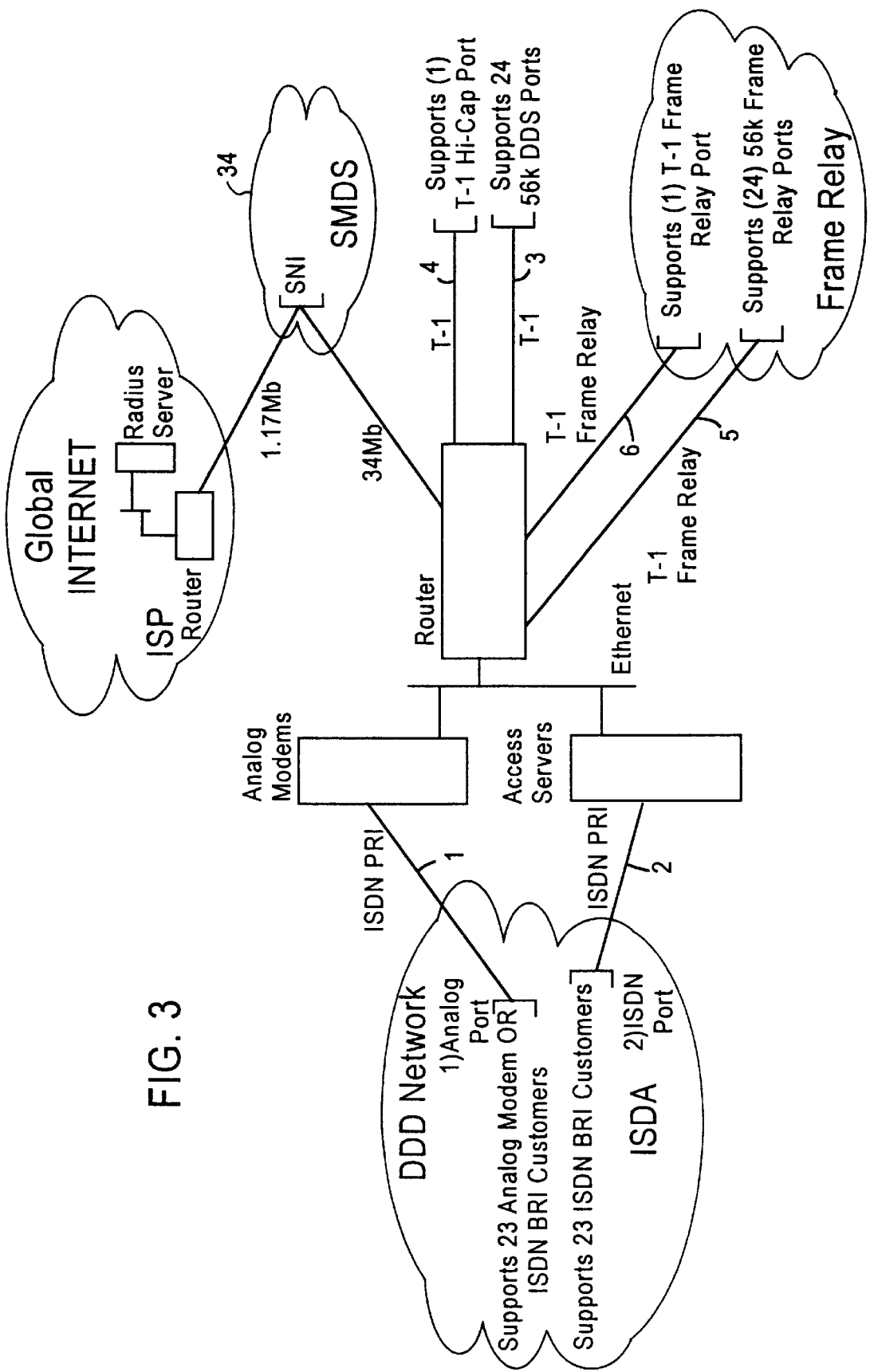
FIG. 3 is a simplified high level functional diagram of the Internet Protocol Routing Service (IPRS) network of the invention showing a typical hub configuration.

Referring to FIG. 3 there is shown a functional depiction of an Internet Protocol Routing Service network according to one preferred embodiment of the invention. A public switched telephone network (PSTN) is shown as a PSTN cloud. Within the PSTN are a switched dial-up analog port (1) and a switched dial-up ISDN port (2). These are connected from an end office switch in the PSTN by ISDN PRI links to analog modems for the dial-up calls which originate as analog, and to access servers for the dial-up calls which are initiated as ISDN calls. The analog port supports 23 analog initiated calls, while the ISDN port supports 23 ISDN BRI dial-up calls.

The modems and access servers are connected to an Ethernet which terminates in a Router. The router is also connected by T-1 links to a Frame Relay network shown as a cloud. These Frame Relay links may be connected respectively to 24 56k Frame Relay ports (5), and to a T-1 Frame Relay port (6). The Router is further connected by T-1 links to a T-1 high capacity (Hi-Cap) port (4), and to 24 56k DDS ports (3), respectively. The Router feeds the SMDS network, shown as a cloud, via a 34 Mb link, and the SMDS network feeds one or more customer or ISP routers in the Global Internet. This latter feed may be via a 1.17 Mb link. The ISP router may be coupled to a RADIUS server for remote authentication purposes.

Figure 4:
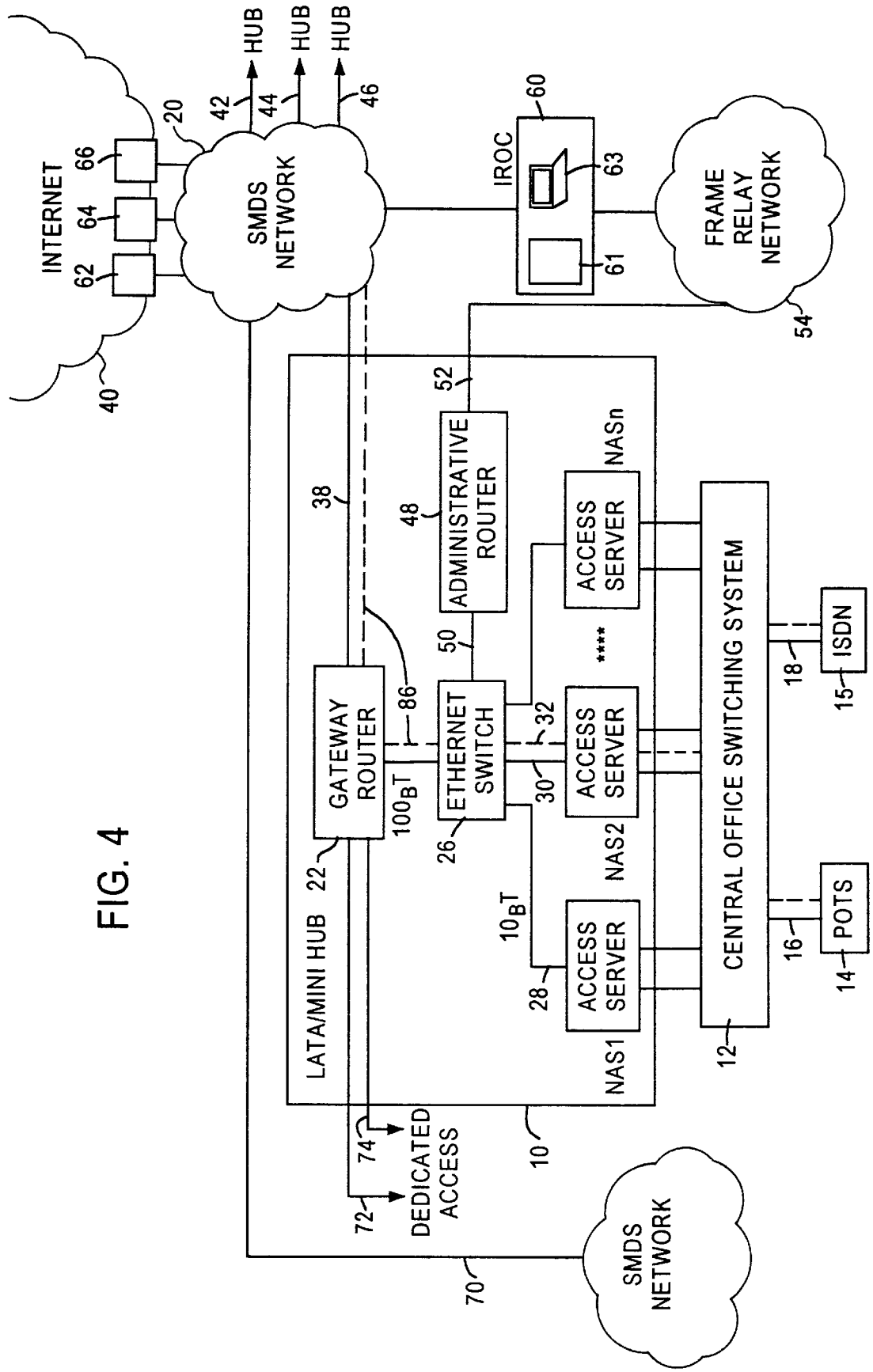
FIG. 4 is a simplified block diagram of the architecture of one preferred embodiment of the public IP transport network of the invention.

Referring to FIG. 4 there is shown in more detail a simplified architectural depiction of the preferred embodiment of the invention of FIG. 3. FIG. 4 may be considered as showing in simplified form the portion of the system which may be found in one LATA of a regional operating telephone company. At 10 there is indicated a LATA/mini-hub which is collocated with a central office switching system or end office switch 12. The central office switch is a program controlled switch such as the 5ESS switch manufactured by AT&T, DMS 100 switch manufactured by Northern Telecom, or an equivalent switch from another manufacturer.

The central office switch is connected by local loops to the premises in the area which it services, here illustratively indicated by the premises 14 and 15. The local loops may comprise twisted pairs 16, as in the case of the premises 14, or an ISDN BRI link 18 in the case of the premises 15. It will be understood by those skilled in the art that this will constitute a large number of premises which may be both residential and business in nature.

Figure 1:
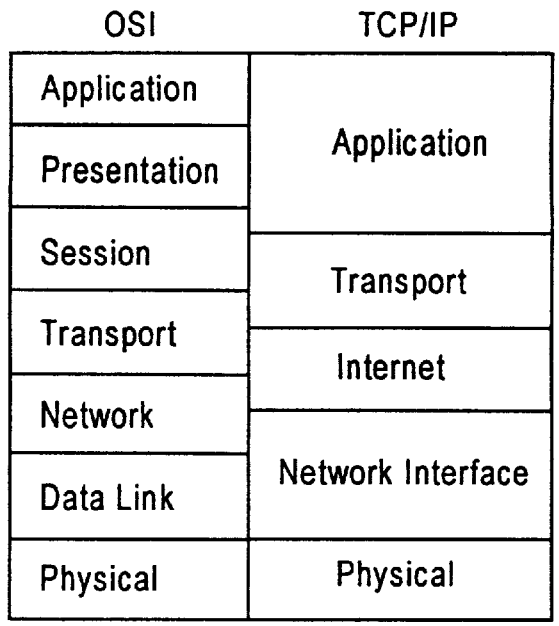
FIG. 1 is a comparative diagram of the International Standards Organization (ISO) Open System Interconnection (OSI) model for network architectures and a commonly used TCP/IP model.
Figure 2:
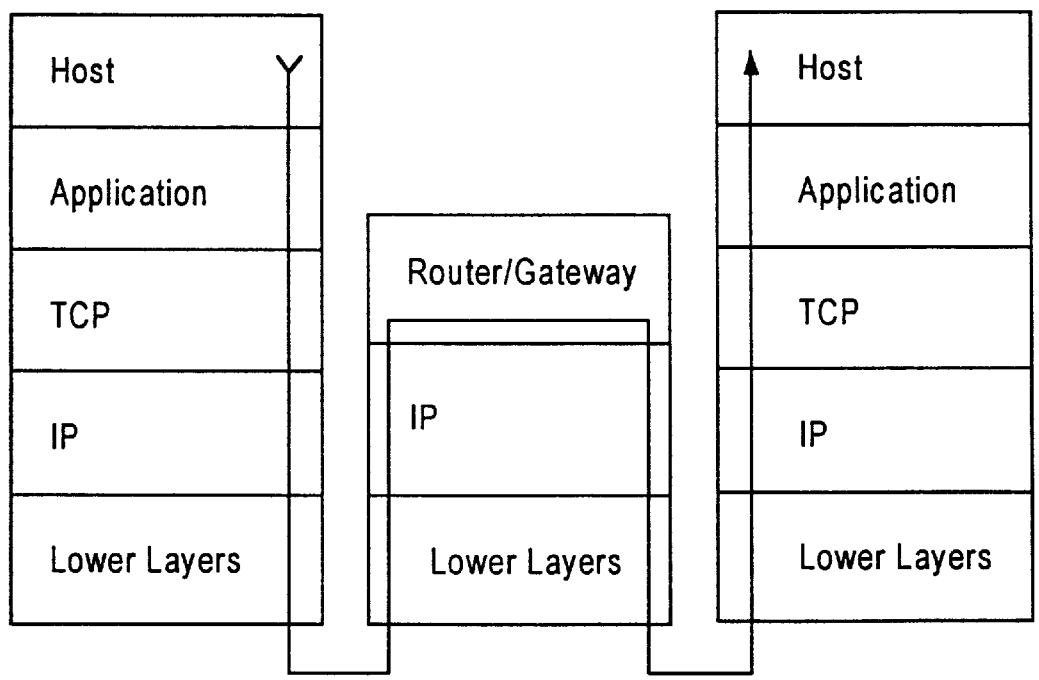
FIG. 2 is a simplified block diagram illustrating the passage of a packet from an initiating host to a receiving host through a gateway.

The occupants of the premises, who are customers of the ISPs, may be characterized as end users. LATA/mini-hubs will be collocated with central office switching systems that serve a predetermined minimum number of end users, such as, for example, 50,000 end users per switching system. The regional operating telephone company or public switched telephone network (PSTN) which includes the central office switching system 12 also includes an SMDS network here indicated pictorially by the SMDS cloud 20. It will be understood that the central office switching systems 12 are connected together by the usual trunks, central office switching systems, tandem switches, and common channel interoffice switching system (CCIS) and Advanced Intelligent Network (AIN), which are not shown in FIG. 1.

The LATA/mini-hub 10 includes a gateway router 22, which is connected by a 100baseT link 24 to an Ethernet packet switch 26. The gateway router 22 serves as the basic gateway to the infrastructure of the system. In practice it may be of the type marketed by Cisco Systems, Inc., of San Jose, Calif., as the Cisco 7500 Series router. The Ethernet packet switch in turn is connected by 10baseT links 28, 30, and 32 to a series of communication access servers, access servers, or NASs, NAS1, NAS2, NASn. The access servers perform on a more limited scale the same functionality as the gateway router and handle either analog or ISDN initiated signals on the central office side. Thus the access servers are shown linked to the central office switch 12 by PRIs 34-1 through 34-n. The gateway router 22 is connected by a link 38 to the SMDS network cloud 20. The SMDS network 20 is connected by links 42, 44 and 46 to additional hubs in the LATA. Each LATA is provided with one hub which acts as a LATA hub whereas the remaining hubs in the LATA serve as mini-hubs for that LATA, for purposes presently to be described. The hubs are substantially identical in construction.

The LATA/mini-hub 10 includes an administrative router 48 connected to the Ethernet packet switch 26 by link 50. According to the invention the operating telephone company provides a maintenance backbone network in the form of a frame relay network 54 which is depicted as a Frame Relay cloud. The administrative router 48 is connected to the administrative frame relay network through the link 56, which may be a 56K or higher link.

The Ethernet switch 26 aggregates the switched access traffic, i.e., the dial-up traffic from the switch 12. The gateway router 22 translates the Ethernet traffic to SMDS delivered to and from the link 38 to the SMDS network 20. The gateway router also serves a similar routing and translating functionality in going from SMDS to frame relay or from Ethernet to frame relay, as will be explained in further detail. The gateway router takes the aggregate of any one specific media and performs the protocol conversion, the network layer protocol conversion, and then performs the routing that switches the packets into the appropriate media. As previously stated, the access servers NAS1–NASn provide a similar functionality narrowed to more specific requirements. The access server may comprise, by way of example, a product manufactured by Cisco Systems, Inc., of San Jose, Calif., as the AS5200. The access servers perform a network access server function and are thus designated in FIGS. 4 and 5 as network access servers or NASs.

The administrative frame relay network or cloud 54 is connected to a central maintenance center which may be called an Internet Regional Operations Center (IROC) shown at 60. The IROC is also connected to the SMDS network 20. The IROC is provided with a server or router 61 and a terminal 63 such as a PC from which a technician may control troubleshooting and provide centralized maintenance of the entire ISP network. It is a feature of the invention that this maintenance backbone Frame Relay network is provided to troubleshoot and maintain the entire IP or IPRS transport network. The administrative router has access to all of the different modules of equipment in the hubs both through the SMDS network as well as through the Frame Relay overlay network to the IROC. The Frame Relay network 54 traverses all hub sites.

According to the invention the operation of the entire IP transport network is monitored using simplified network management protocol (SNMP). When trouble is detected it is analyzed using the Frame Relay back-up network and correction is effected through that network. The maintenance center includes a server and a group of terminals providing interfaces to SMDS and Frame Relay. The overlay Frame Relay network is used to provide automated management and maintenance functions beyond routine monitoring. This network may be maintained entirely private and provides secure addressing and levels of security not available via the main SMDS network.

The SMDS network 20 is connected to customers, normally ISPs, indicated at 62, 64 and 66, within a Global Internet cloud 40. Such customers would normally constitute Internet service providers such as UUNet, PSI, Aegis, etc. Such ISPs could also include a service operated and maintained by a Telco in compliance with equal access requirements.

Dedicated access to the public IP transport network is provided at LATA hubs. SMDS dedicated access is connected direct to the SMDS network or cloud 20, as indicated at 70 in FIG. 4, bypassing the LATA hub 10. On the other hand the SMDS dedicated access may be connected to the LATA hub as a connection point while bypassing its operation. This reduces the traffic load on the hub. Frame relay, DDS, T1 and other grades of access are connected directly to the gateway router 22 as illustratively indicated at 72 and 74.

Figure 5:
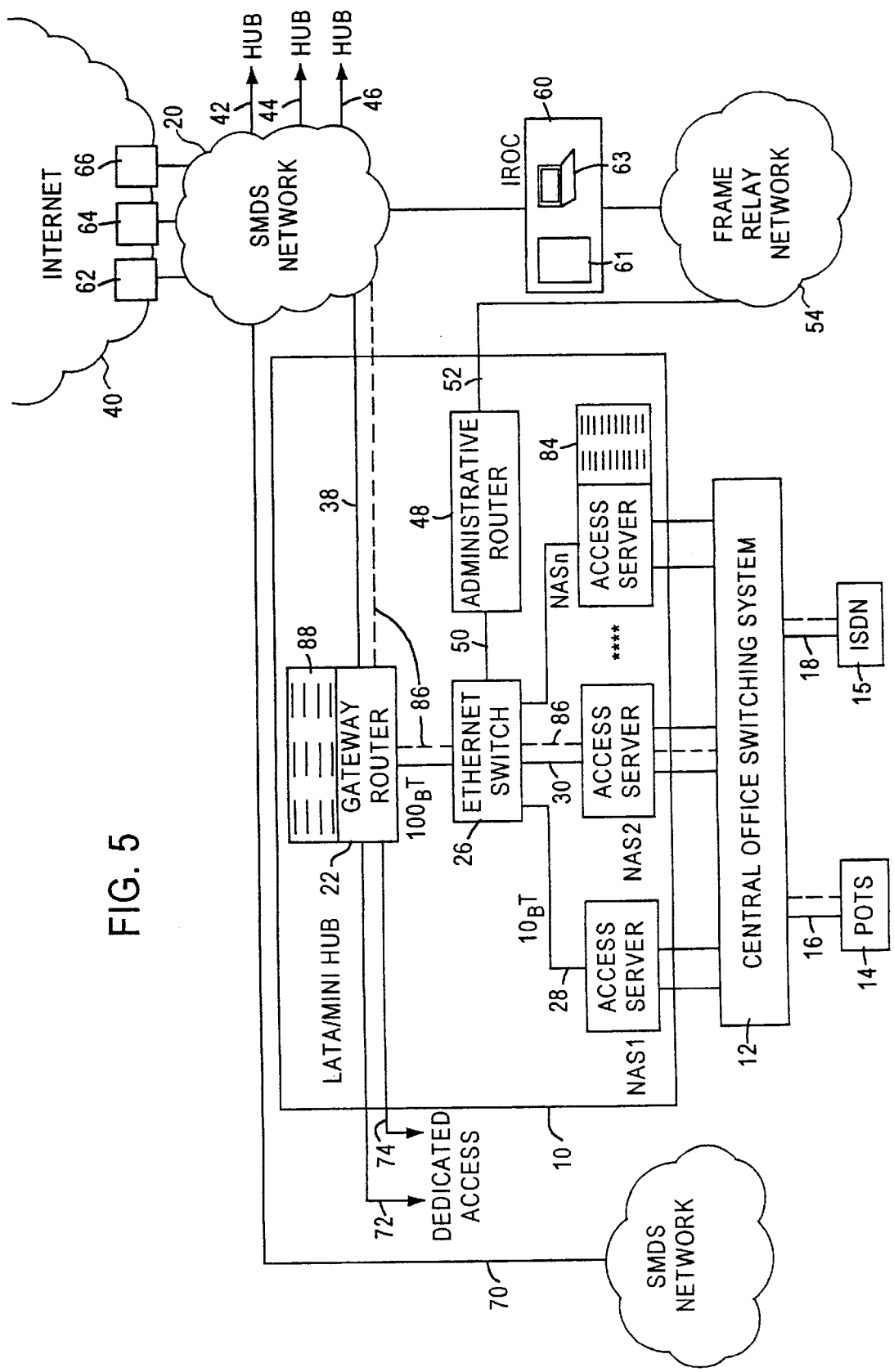
FIG. 5 is a simplified block diagram of the network of FIG. 4 supplemented with additional detail and functional depiction.

Referring to FIG. 5 there is shown a more detailed version of the system in FIG. 4. Similar reference numerals are utilized in FIG. 5 to indicate the same elements as in FIG. 4.

Each access server or NAS in the hub performs a function called Network Access Server function or NAS function. To this end each access server is provided with a table which includes IP address pools, indicated graphically at 84. Each IP address pool contains a range of IP addresses associated with a particular ISP customer 62–66 connected to the SMDS network 20. When an end user's call is received an authentication process is initiated regardless of the type of call. When the PPP (point-to-point protocol) connection is brought up a link control protocol (LCP) is initiated and executes an authentication protocol. When the customer initially sets up a TCP/IP stack one of the elements installed is a log-in ID and password. However, this is accomplished in an initial entry and is not brought up in each live use session. This authentication is in the LCP layer and is automated. Once established it automatically executes transparently for each use. The procedure is sometimes referred to as PAP/CAAP (Packet Level Procedure/Call Appearance Level Procedure).

At the start of each session there is a negotiation for a PPP connection which establishes the TCP/IP session. This passes along the access protocol, the login, and the password, which are installed in the customer software. As this is passed along to the network access server software, communication is established through the access server, the Ethernet packet switch 26, the gateway router 22, and the SMDS network or cloud 20 to the customer or ISP. This signal path is indicated in FIG. 5 by the broken line 86. Authentication then occurs, i.e., the user ID is passed along, a table is interrogated in the authentication server, where the ID is identified as a valid account, and the password is verified. From that authentication an IP address is authorized for issuance and is issued.

The IP address is associated with the pool of data information 84 in the access server or NAS. Assuming that each end user at a premise 14 or 15 has a preselected long distance ISP provider having its own access pool, this procedure results in the selection of the predesignated address pool.

An ISP may have established a relationship with one or more IP traffic carriers, such as Aegis, Digital Express, or the like. The ISP may also have selected an Interexchange Carrier (IXC), such as AT&T, for example. The customer ISPs are provided pools of addresses based on the identity of the interexchange carriers and IP carriers selected. The IP pool 84 thus contains multiple address pools for multiple carriers. On an individual call the ISP server may direct the access server or NAS to provide an address from an Aegis pool, by way of example.

The address changes for each call but is selected from the predesignated pool of addresses. Once an IP address is issued the accounting record starts and a start time, start record is generated. From that point the signal is routed out across the access server NAS through the Ethernet packet switch 26 to the gateway router 22 where the second element of the equal access process is effectuated. This is here referred to as "route policy" or RP. The gateway router is provided with a route policy table indicated illustratively at 88. That table shows a range of address space associated with a next hop IP address for the ISP for the caller's primary interexchange carrier or PIC. Any subscriber to the ISP service has the opportunity to select his own primary interexchange carrier or PIC.

The router inspects each incoming packet, determines the originating IP address, uses the IP address to access the table of policy, and from that look-up associates it to the IP address of the IP's gateway router. The router then routes the packets to the next hop address in the absence of being pre-designated to a specific ISP. The next hop destination is thus the default address associated with the ISP gateway router. Equal access consists of two parts, authentication and issuing an IP address out of the pool and then handing this off to the router. The router looks at the originating address received from the pool and based on the originating address, routes to the appropriate ISP or PIC such as, for example, Aegis. Anything coming in on the Ethernet 100baseT port is processed using this route policy. That policy dictates translating the source address into the next hop address for the signal's PIC.

It should be understood that for customers such as Aegis, the equal access policy is inapplicable, and standard routing may be utilized. However, in the case of a Telco ISP it is currently necessary to comply with equal access strictures. The gateway router is programmed to recognize this fact and to route accordingly. It will thus be seen that source routing is utilized in two respects, i.e., in regards to the grade of service made available and also in regards to the selection of an ISP or PIC.

In the equal access PSTN service described above a customer such as an Internet access provider by way of example, who has a subscription to a large number of LATA hubs, will have a plurality of telephone numbers equal to the number of hub ports which are subscribed. This may be equal to the number of subscribed LATAs but may be larger if the customer also has both analog and ISDN subscriptions or ports. In that event the number of ports will be doubled. It is a feature of this embodiment of the invention that the PSTN may provide to such a subscriber a single number access service which would eliminate the need for multiple directory numbers. By utilizing an advanced intelligent network (AIN) overlay with the network shown in FIG. 4 it is possible to provide a customer with single number service.

In an AIN system, central offices having a service switching point (SSP) exchange data messages with an integrated services control point (ISCP) via a switching transfer point (STP). At least some calls are thus controlled through multiple central office switches using data retrieved from a database in the ISCP. A more exhaustive description of an AIN system, suitable for implementation in connection with the present invention, is provided in U.S. Pat. No. 5,247,571 to Kay and McConnell, the disclosure of which is incorporated herein by reference. The Kay and McConnell patent is assigned to the assignee of the present invention.

Figure 6:
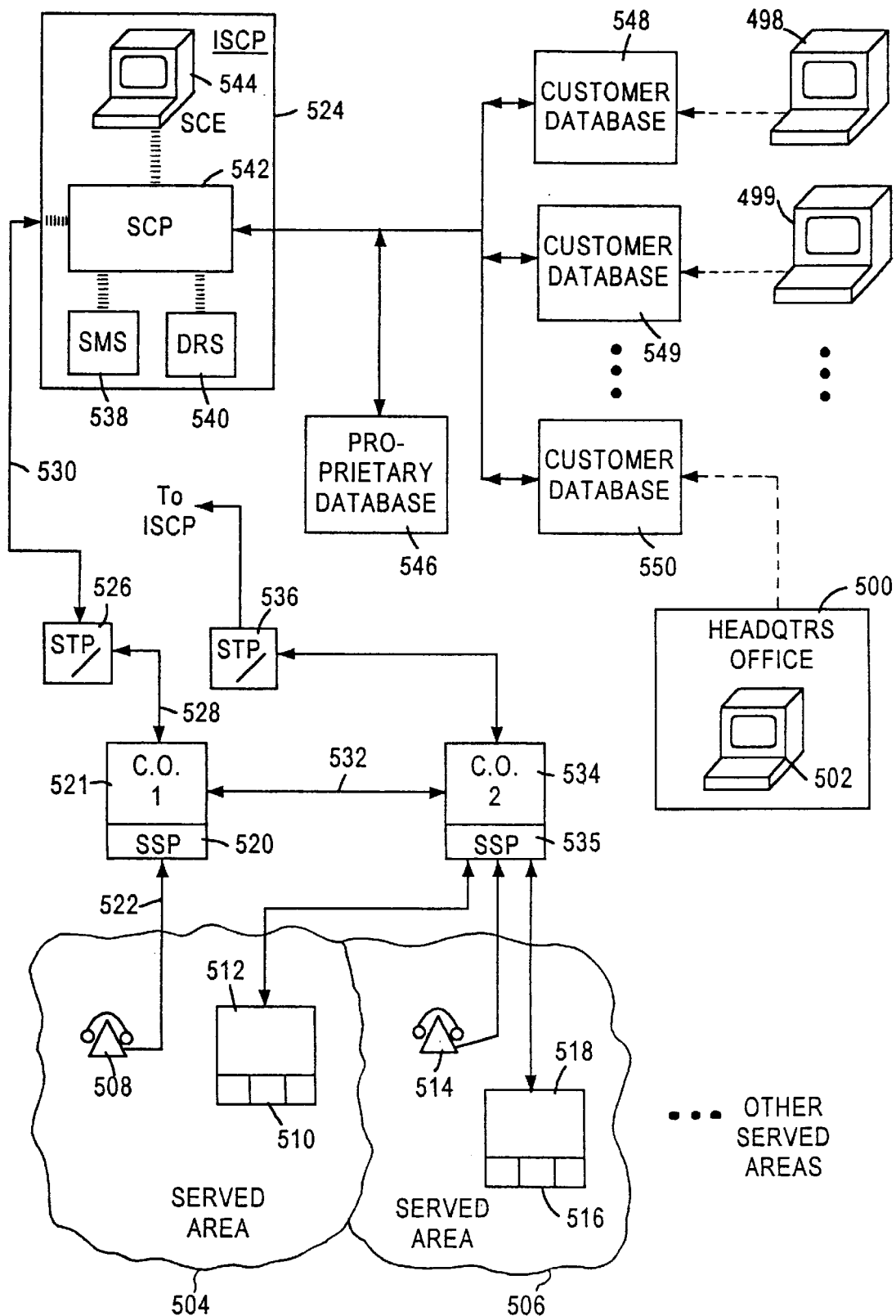
FIG. 6 is a schematic block diagram schematically illustrative of a telephone system including call routing and processing in accordance with another embodiment of the invention.

FIG. 6 is a block diagram of a telephone system including components of an advanced intelligent network and of this embodiment of the invention, which helps to illustrate its structure and operation. It will be recognized, of course, that FIG. 6 is considerably simplified for explanation purposes and that the full network and operating environment for this embodiment of the invention may comprise multiple central offices, diverse interconnections, and provisions for reliability through redundancy, all of which need not be shown for developing an understanding of the invention. A more complete description of a typical AIN network may be found in U.S. Pat. No. 5,475,732 to Eugene M. Pester, III, issued Dec. 12, 1995, entitled "Common Channeling Signaling Network Maintenance and Testing." This patent is also commonly owned with the present application.

Referring to FIG. 6, it may be assumed that a subscriber for Telco transported access to Internet services has an office or facility 500 which includes a graphical processing terminal 502 for use by the subscriber to define territories from which telephone calls placed to single or virtual number provided to the subscriber are to be routed to actual, subscriber preselected, telephone numbers. The selection of an actual telephone number to satisfy the equal access purposes of the PSTN pursuant to governmental regulations is not necessarily the sole basis for selection of an actual number. Internet service providers may well have multiple actual telephone numbers which are assigned within a LATA based on the geographical location of the Internet service provider's customers. The function and operation of the graphical processing terminal 502 will be covered in detail in the ensuing discussion. The office or site 500 need have no fixed location, nor is there any absolute requirement that there even be an office. Graphical processor 502 is accessible by the provider customer, or someone, on the provider customer's behalf, for purposes of defining boundaries and setting routing telephone numbers. The graphical processor 502 may be located, for example, in any of the customer defined territories in a LATA and may, in fact, be entirely portable for operation at any convenient location. It is preferably a stand-alone processor, as will be described below, and need have no permanent or continued connection to any other system component.

As illustrated in FIG. 6, the provider customer has various served territories, including contiguous served areas 504, 506, and others as indicated by legend. All of the served areas, taken together, may cover some broad geopolitical area such as a LATA, city, county, state, group of states, or they may cover the entire United States. The served areas need not be contiguous and there may be some served areas which are isolated from others. Generally, a call placed to the provider customer's single or virtual telephone number from telephone 508, for example, located in served area 504, will be routed to the port 510 located in network access server or NAS, 512 which is located in a mini hub, such as shown in FIG. 4, in the LATA of telephone 508, which is located in area 104; similarly, a call to the single or virtual number from calling station 514, located in area 506, may be routed to the port 516 located in its terminal access server or NAS 518, which may or may not be in the same area 506 as the calling station 514. Calls arising in other served areas of the provider customer will similarly be routed to an appointed port, NAS, and mini hub.

A call to the provider customer's single or virtual number from telephone 508 begins with a party at the calling station 508 dialing that number, usually by autodialing under the control of the customer premise PC being used to access the Internet. The single or virtual number may be the usual 7-digit telephone number, a full 10-digit number including the three NPA digits, or an 800 number. In any case, an SSP 520 (i.e., a switching means) located in a first central office 521 receives the dialed digits by way of the local loop 522. The SSP 520, programmed to recognize the virtual number as an action trigger requiring AIN direction for routing, momentarily suspends processing of the call and formulates a query message for that purpose to be sent to the ISCP 524. The query message format and the means of its conveyance to the ISCP 524 are as described in the Kay and McConnell patent, but for present purposes it will include the provider customer's single or virtual number and an indication, such as the automatic number identification (ANI), of the calling station's number. It will also include an indication of call type (here, that the call is placed to a virtual number and that it is analog or ISDN) so that the ISCP has an indication of the treatment the call is to receive.

The message signaling pathway to the ISCP 524 is by way of STP 526, connected on one side by data link 528 to the central office 521, and on the other side to ISCP 524 by data link 530. The ISCP 524, in conjunction with peripheral databases, is operative, as will be described, to determine from the provider customer's virtual number, the calling station's ANI, and the analog or ISDN nature of the call, the actual phone number to reach port 510 in TAS 512. Once determined, that number is returned in an appropriately formatted routing message, by way of STP 526, to the SSP 520 of central office 521. Upon receipt of the routing message, the SSP 520 resumes call processing for the call and it is routed, in this case, via trunking system 532, to a second central office 534 serving ports 510 and 516 located, respectively, in the terminal access servers or TASs 512 and 518. The second central office 534 delivers the call to port 510.

By similar processing, a call originating at telephone 514 in the subscriber's territory 506 will be routed to the port 516 in the terminal access server 518. In this latter case, however, since the call is both originated and terminated by the second central office 534 there is no routing from one central office to another. Nevertheless, the ISCP 524 is queried for virtual number routing instructions. Thus, the second central office 534 also includes an SSP 535 and has access to the ISCP 524 through an STP 536 and associated data links for virtual number call routing purposes even though the call itself is not routed beyond the serving central office 534. As will also be recognized by those of skill in the art, in the event a call is routed from one central office to another, the ISCP 524 may be queried for routing instructions by either the originating or the terminating SSP.

The ISCP 524, comprised of a service management system (SMS) 538, a data and reporting system (DRS) 540, a service control point (SCP) 542, and a service creation environment (SCE) 544 is described in the Kay and McConnell patent. The SCE 544 provides a gateway for initial entry and updating of data pertinent to call routing in accordance with the invention. For what may be regarded as typical AIN applications, the ISCP 524 provides a complete system for carrying out the function of those applications. When operative for the present invention, however, the SCP 542 of the ISCP 524 has access to additional databases, including, first, a proprietary database 546, and second, a plurality of customer accessible databases 548–550. The first database 546 is proprietary to the operator of the telephone system. Of the customer accessible databases 548–550, there is one for each virtual number in operation (i.e., usually a database for each virtual number subscriber or each Internet access provider or customer in this example).

Figures 7, 8, 10:
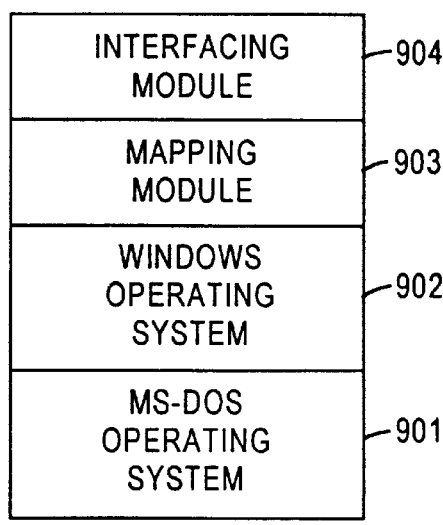
FIG. 7 is a table illustrative of a first common database that relates ANI information with postal zip code information.
FIG. 8 is a table is illustrative of a second database that relates postal zip code information with subscriber destination information.
FIG. 10 is a simplified block diagram of the software architecture for a graphical processing terminal according to the invention.

The contents of the proprietary database 546 is accessible only to the telephone operating company. Its contents include a file relating the telephone number of calling stations (including telephones 508, 514, and others) to an indicator of the geographic location of each calling station. The geographic indicator may be the postal zip code of each station's location, and preferably would be its full 9-digit postal zip code so that the geographic location of a calling station is precisely indicated. This information is available from the telephone operating company's business files since it is generally obtained for billing and other purposes when an end user customer signs up for basic telephone service. This relational data for database 546 is loaded and is accessible for other data management purposes, such as file updating, through the SCE 544 and SCP 542. FIG. 7 provides an example of the file contents of the proprietary database 546.

The provider customer accessible databases 548–550 are preferably provided and maintained by the telephone operating company, but they are each accessible by the provider customer, or provider subscriber, so that data can be entered and altered as required to create customized call routing plans, or tables, for the virtual number to which the particular database relates. For that purpose, each provider customer or subscriber may have available a graphical processing terminal to create the data that gets loaded into the respective customer databases. Office 500 terminal 502 is associated with customer database 550, and terminals 498 and 499 are associated, respectively, with customer databases 548 and 549. The data content is essentially in the form of a table, for the particular virtual number, that relates geographical indicators from the proprietary database to actual telephone numbers of ports in the NASs in the mini hubs. Thus the table relates a calling station's 9-digit postal zip code to a mini hub and terminal access server and port therein. Effectively, by determining the relationship between zip codes and actual telephone numbers, the provider subscriber is able to set boundaries for territories to be served by various mini terminal access servers and ports. FIG. 8 is an example of the file contents of a provider customer accessible database.

In operation, whenever the ISCP 524 receives a virtual number routing query message from a central office, which number is assigned to a provider subscriber, the SCP 542 accesses the proprietary Telco database 546 with the directory number of the calling station (the ANI) and retrieves the corresponding 9-digit zip code. Using the provider customer or subscriber's virtual number, the customer database that contains the routing plan for that virtual number is then accessed from one of databases 548–550, and the 9-digit zip code is cross-referenced to the corresponding actual telephone number for the correct port. By this arrangement, the proprietary first database 546 serves as a common reference point for access to any number of virtual number databases 548–550, each available to a provider customer or subscriber for independently customizing its own routing plans as desired for their particular service. All of these draw upon the relatively static content of the first database while providing the dynamics needed for customization through the second databases.

Figure 9:
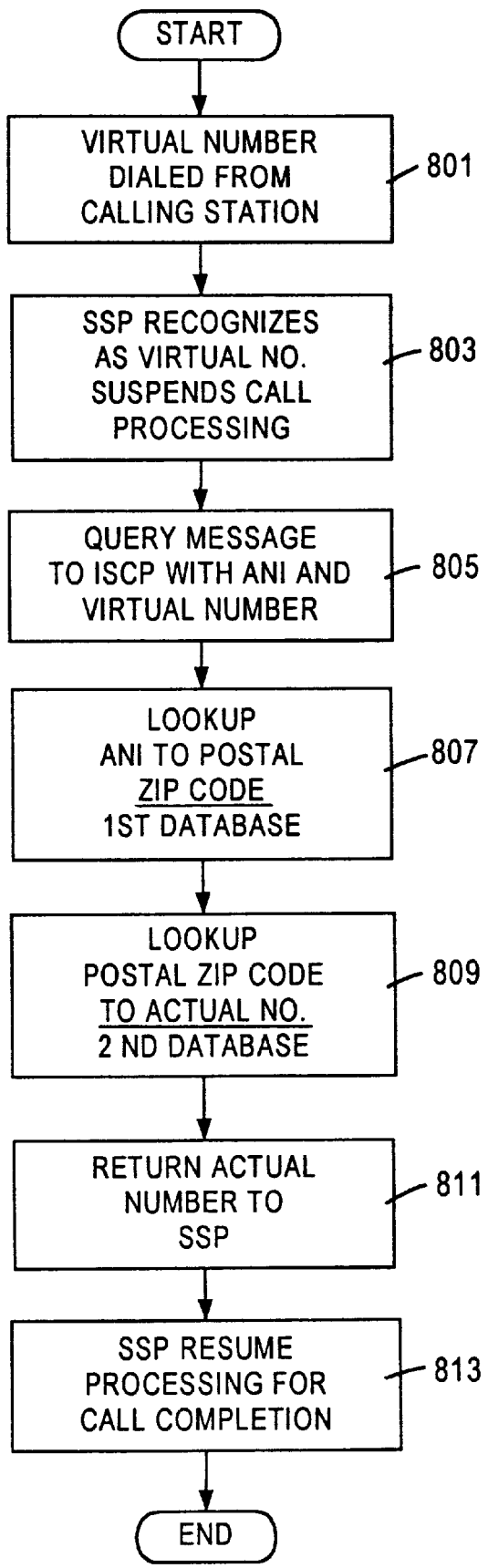
FIG. 9 is a simplified block flow chart exemplifying the processing steps for call routing in accordance with the invention.

The flow chart of FIG. 9, considered with FIG. 6, outlines the overall call processing steps. Initially, at step 801 the calling station, station 508, goes off-hook and the virtual telephone number is dialed from that station. The SSP 520 in central office 521 recognizes from the dialed digits, in step 803, that the call is to a virtual telephone number and, therefore, that the ISCP 524 must be consulted for routing instructions. This action trigger causes the SSP 520 to momentarily suspend its processing of the call, and, at step 805, to formulate and send a query message to the ISCP 524. The query message is in a standardized format, but it includes the virtual number and the ANI for the calling station 508.

The ISCP 524, in turn, upon receipt of the query, acts through the SCP 542, to access the system's proprietary database at step 807 and to look up the postal zip code corresponding to the received ANI. Other geographic indicators besides zip codes can be used, but for reasons that will become clear, zip codes are preferred. The geographic indicator, whether zip code or otherwise, is transparently used by the subscriber. At step 809, with the postal zip code determined, and from the virtual number, the SCP 542 then turns to the appropriate customer database 550. Database 550 contains a file, created by operation of graphical processor 502 and uploaded therefrom, that relates the zip code to an actual port telephone number. In this case the actual telephone number determined is that of port 510 located in the terminal access server 512 in served area 504. Once the telephone number is retrieved from the customer database 550, it is forwarded in a response message at step 811 back to the SSP 520 in central office 521. The SSP 520 then, in step 813, resumes its processing of the call by directing it to the second central office 534 which sends it to the port 510.

Although there may be various ways to put together the relational data required for populating a customer database, a graphical terminal, such as terminal 502, provides a way for the subscriber merely to set the geographic boundaries of served territories without having to deal directly with the geographic indicators, zip codes, used in the customer database. Such a terminal would eliminate a need for using manual methods to select and draw boundaries around all of the territories to be served, to pick out of each territory all of the 9-digit postal zip codes and relate them to the appropriate phone number, and then to sort the various territorial data into an organized table for entry into the database.

A personal computer (PC), preferably one that is compatible with MS-DOS and Windows (trademarks of Microsoft Corporation) operating systems can serve as the starting platform for a graphical processing terminal. The software hierarchy for such a processor is illustrated in FIG. 10. At the most basic level are these well known operating systems, MS-DOS and Windows, 901 and 902, respectively. On top of the two operating systems and interactive therewith is a "mapping" software module 903, which is operative to assist in the creation of street and other kinds of local area maps for graphical presentation to a user on the terminal's screen (not illustrated). The mapping software 903 is preferably one of the many commercially available software packages capable of providing a base set of functions for creating maps and a programming language with which particular applications can be integrated with map presentations. Suitable mapping software is available, for example, from MapInfo Corporation of Troy, New York under the names MapInfo for Windows and MapBasic for Windows, and from TerraLogics, a corporation having an office in Reston, Va., under the name TerraView.

Interactive with the mapping software module 903 in the Windows environment is an interfacing software module 904 to facilitate, overall, a "negotiation interface" for area number calling, i.e., for virtual number calling plans. As will become clear, one purpose of the interfacing module 904 combined with the mapping module 903 is to provide a virtual number subscriber the ability to create arbitrarily bounded geometric areas that may include, for example, polygons and circles. These areas are designed by the user as desired to become served areas for specified ports in accordance with files automatically created for those areas that relate postal zip codes to actual phone numbers. Such files can then be exported to the customer data bases maintained for call routing.

As previously described, a customer such as an Internet access provider, by way of example, who has a subscription to a large number of LATA hubs, will have a plurality of telephone numbers equal to the number of hub ports which are subscribed. This may be equal to the number of subscribed LATAs but may be larger if the customer also has both analog and ISDN subscriptions or ports. It will be appreciated that the above described feature of the invention provides a solution to this problem. Thus the PSTN which provides the system and service of the invention also may provide to such a subscriber a single number access service and thereby eliminate the need for such multiple directory numbers. According to a preferred embodiment this is accomplished by utilizing an advanced intelligent network (AIN) overlay with the basic network. With this arrangement the identity of the calling station is determined, a database is accessed to match this station with a geographical location, a second database is accessed to match the location to the number of the ISP subscriber node port serving that geographical area, and the call is then routed to the node port number which was obtained.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. In a public switched telephone network (PSTN) having a plurality of PSTN multiport nodes located respectively in a plurality of served geographical areas, said multiport nodes connected to a PSTN data network having port numbers corresponding to virtual numbers associated with respective internet service providers subscribing to PSTN service through said multiport nodes via said PSTN data network, a method for routing a data call, placed to one of said virtual numbers from a calling station location in said PSTN, to a respective one of said plurality of multiport nodes predesignated to serve the geographical area containing the location of the calling station, comprising the steps of:

determining the identification of the calling station;

accessing a first database having content relating the identification of the calling station to an indicia code of the calling station's geographical location to obtain the calling station's corresponding indicia code;

accessing a second database having content relating the calling station's indicia code to a number of the internetwork service provider subscriber node port serving the geographical area of the calling station to obtain a related node port number; and routing the call to the node associated with the port number obtained in said step of accessing said second database.

2. A method according to claim 1 wherein said indicia code comprises postal zip code.

3. A method according to claim 1, further including the steps of:

processing signals from said calling station in the node to which said call has been routed in said routing step to translate and route said signals between the calling station and said PSTN data network to which the internetwork service provider subscriber is connected.

4. A method according to claim 3 wherein said PSTN data network comprises a switched multimegabit data service network operating in a connectionless mode.

5. A method according to claim 3 wherein said processing in said node includes data switching and packet addressing.

6. A method according to claim 1, wherein said PSTN includes service switching points and is controlled by a separate common channel signaling network having a separate controller with access to databases, said controller being connected by data links and service transfer points to said service switching points, including the steps of:

receiving the call from the calling station and, responsive to recognizing the call as one being placed to a virtual number, suspending processing of the call to formulate a routing query message containing an identification of the calling station and the virtual telephone number, transmitting said routing query message via at least one of said service switching points and at least one of said service transfer points to said controller, responsive to receiving said query message at said controller, accessing a database associated with said controller to identify the internetwork service provider subscriber to said virtual number, and using said identity of said service provider subscriber to select said second database.

7. A method according to claim 6 including the step of accessing said second database from said controller.

8. A method according to claim 7 wherein said controller is an integrated service control point.

9. A method of providing internetwork data services via a public switched telecommunications network (PSTN) spanning a plurality of geographical areas and having central office switching systems serving premises in each of said geographical areas via links between said central office switching systems and said premises and having a separate common channel signaling control system and controller spanning said plurality of geographical areas and including databases associated with said controller; said method comprising the steps of:

providing in each of a plurality of said geographical areas a multiport data network node connected to said PSTN and having routing and data switching capabilities; and routing a data call dialed to a virtual number from one of said premises via a central office switching system to which said one premise is connected by one of said links from said central office switching system to a port in one of said data network nodes in the geographical area in which said one premise and said central office switching system to which said one premise is connected are located;

wherein said routing step comprises:

selecting said port based on the virtual number and on the identity of said one premise, and directing said call via the selected port through the data network node in which said port is located to a switched multimegabit data service network and via said switched multimegabit data service network to an internetwork service provider connected to said switched multimegabit data service network; and selecting said internetwork service provider in response to a signal from said controller, wherein the information in said signal is at least partially based on a search of one of said databases associated with said controller.

10. A method according to claim 9 wherein said port is selected based on the virtual number and on the identity and geographical location of said one premise.

11. A method according to claim 10 including the step of determining the geographical location of said one premise from a data base accessed by said controller.

12. A method according to claim 11 wherein said data base from which said geographical location of said one premise is located is controlled by said public switched telecommunications network.

13. A method according to claim 11 including the steps of using the geographical location of said one premise determined from said database accessed by said controller to access a second data base, and determining from said second data base the identity of said port.

14. A method according to claim 13 wherein said second database is accessible to said network service provider connected to said switched multimegabit data service network and editable by said network service provider.

15. A method according to claim 14 including the step of connecting said data call from said one of said premises via said switched multimegabit data service network and said service provider to the Internet.

16. A wide area internetwork including a public switched telecommunications network serving multiple geographic areas and comprising in combination:

a switched telecommunications network (PSTN) having trunked central office switching systems connected by local links to end user subscribers premises stations in said geographic areas and associated with service switching points, said PSTN being controlled by a separate common channel signaling network having service transfer points connected by data links to said service switching points and connected to a service control point having databases associated therewith;

a switched data service network having internetwork service provider subscribers to said PSTN connected thereto for providing internetwork service to at least some of said end user subscribers;

at least one hub node having routing and switching capabilities located in each of said geographical areas and connected to said switched data service network;

said at least one hub node including a router connected to said switched data service network and a packet switch connected to said router, said packet switch being connected via a multiport server to a central office switching system comprising or associated with one of said service switching points, said service provider subscribers having subscriptions to selected ports in said servers;

said ports in said servers being connected to at least some of said end user subscriber premises stations via said local links;

said databases associated with said service control point including one or more databases for translating virtual numbers assigned to said internetwork service provider subscribers to actual numbers and to identifications of ports in said servers under subscription to said internetwork service provider subscribers;

said last named databases being used by said service control point to connect end user subscribers calling virtual numbers assigned to said internetwork service provider subscribers to said internetwork service provider subscribers via said local links, servers, packet switches, routers, and said switched data service network.

17. A network according to claim 16 wherein said data base associated with said service control point includes at least one data base under the control of said PSTN.

18. A network according to claim 17 wherein said data base associated with said service control point includes at least one data base under the joint control of said PSTN and said internetwork service provider subscribers.

19. A network according to claim 18 wherein one of said data bases provides translations from virtual numbers to actual numbers of said internetwork service provider subscribers and another of said data bases provides translations of actual numbers of said internetwork service provider subscribers and identification of calling end user subscribers to port identifications.

20. A network according to claim 19 wherein said data bases providing translations of actual numbers of said internet service provider subscribers to port identifications are under at least partial control of said internet service provider subscribers.

21. A network according to claim 20 wherein said data bases providing translations of actual numbers of said internet service provider subscribers to port identifications provide said translations based upon the geographical location of said end user subscriber premises.

22. A network according to claim 21 wherein said data bases providing translations from virtual numbers to actual numbers of said internetwork service provider subscribers include at least one data base providing translations from the identification of a calling end user subscriber premises station to an indicia code of the geographical location of said calling end user subscriber premises station.

23. A network according to claim 22 wherein said data bases include a data base translating said indicia codes to port identifications.

24. A network according to claim 23 wherein said data base translating said indicia codes to port identifications is connectable to internetwork service provider subscriber processors capable of altering the content of said data base.

25. A network according to claim 16 wherein said switched data service network is a switched multimegabit data service network.

* * * * *